UNITED STATES PATENT OFFICE.

GEORGE HILLARD BENJAMIN, OF NEW YORK, N. Y.

MANUFACTURE OF STEEL.

1,095,184.   Specification of Letters Patent.   Patented May 5, 1914.

No Drawing.   Application filed December 2, 1910.   Serial No. 595,211.

*To all whom it may concern:*

Be it known that I, GEORGE HILLARD BENJAMIN, a citizen of the United States, residing at the city, county, and State of New York, have invented certain new and useful Improvements in the Manufacture of Steel, of which the following is a specification.

Broadly stated, my invention consists in a method of treating molten iron or steel for the purpose of removing phosphorus and sulfur.

To carry my invention into effect, I proceed as follows: Molten iron is charged into a converter having an acid lining, and treated in the usual manner for the removal of silicon and the whole or a portion of the contained carbon. The molten mass is then withdrawn from the converter and charged into a mixer having a basic lining and provided with means for heating. In order to prevent the acid slag of the steel from the converter attacking the lining of the mixer, and to in a measure remove the phosphorus and sulfur, I introduce a basic slag. In place of first introducing the molten steel and then the basic slag, I may first introduce the basic slag and charge the molten steel through the slag. After treatment in the mixer, charges are withdrawn therefrom and introduced into a vessel having a basic lining. This vessel may be given any suitable shape, that is, it may be constructed as a part of a furnace such for instance as the movable hearth disclosed in U. S. Letters Patent No. 948,538 granted to me February 8th, 1910, or as a crucible situated within a furnace, or as a ladle, or as a specially designed converter. Upon the charge in such vessel, I charge the required quantity of oxid of iron, burnt lime or limestone; preferably these materials are added in definite quantities at definite times. The combined materials are then subjected in the vessel, to a high temperature and to the influence of the gaseous body resulting from the instantaneous combustion of a hydro-carbon gas and air, these bodies being introduced in definite quantities previously mixed and under pressure.

In practice I have found that if a carbon gas, such as may be produced in a water gas producer and preferably high in hydrogen, is introduced under a pressure of approximately one pound, and air under a pressure of approximately one and one quarter pounds to the square inch, and mixed at the burner orifice, instantaneous combustion will take place, with the production of a very high temperature, approximating 3500° Fahrenheit, and a gaseous body consisting mainly of carbon dioxid and nitrogen. I have also found that if provision is made to allow the evolved gases due to combustion, to leave the vessel, that there will be no chemical combination between the carbon of the gas as introduced, or the gas or gases as produced by combustion, and the oxygen associated with the iron or limestone introduced into the charge. This condition is probably due to the fact that the gaseous body due to combustion has practically all the carbon carried thereby associated with oxygen derived from the introduced air to form $CO_2$. The gaseous body due to combustion apparently serves also as a protective blanket to prevent oxygen from the air from entering the vessel and entering into combination with the bodies contained in the vessel.

It will be seen from the above that the gases due to combustion are in a sense inert, and that they contain no oxygen which may be combined with the charge, nor do they exercise any reducing effect, owing to the absence of any considerable amount of free carbon. Further, I have observed that the presence of highly heated nitrogen gas not only aids chemical combination of the phosphorus and sulfur with the oxids of iron and calcium to form a slag in which these bodies are all combined, but tends to improve the character of the final steel product. After the phosphorus and sulfur have been removed from the steel to the required extent, the slag may be removed and the metal tapped from the furnace and cast into ingots, or otherwise treated as desired, by the addition of nickel, manganese, titanium, vanadium, silicon or other bodies required to produce the character of steel desired, or these bodies may be subsequently added in the ladle or in subsequent treatment.

I do not wish to limit myself in any wise to the pressures to which the gas and air are subjected, provided that the proportions of these bodies is such that there will be instantaneous combustion at the burner orifices, nor do I wish to limit myself to the construction of the vessel (whatever its form) in which the reactions above specified take place in the presence of an inert atmosphere and at the required temperatures.

Having thus described my invention, I claim:

1. An improvement in the manufacture of steel, which consists in effecting chemical combination between the phosphorus and the sulfur contained in molten steel and the oxids of iron and calcium in the presence of an inert gas and under the temperature conditions which will effect the required reactions.

2. An improvement in the manufacture of steel, which consists in first removing the silicon and the major portion of the contained carbon, then converting the molten acid steel into a molten basic steel by the action of a basic slag, then charging into the molten basic steel the required quantity of metallic oxids, then subjecting the combined materials in the presence of an inert gas to the action of sufficient temperature to cause the metallic oxids to combine with phosphorus and sulfur and aid in the formation of a slag.

3. An improvement in the manufacture of steel which consists in first treating iron in a converter to remove the silicon therefrom, then charging the acid steel into a mixer and therein converting the acid steel to a basic steel, by the action of a basic slag, then charging the basic steel into a furnace adapted to be highly heated and there subjecting it to the action of metallic oxids in the presence of a non-combining gaseous atmosphere.

4. An improvement in the manufacture of steel which consists in subjecting basic steel to the action of high temperature and metallic oxids in a furnace having a neutral atmosphere.

5. An improvement in the manufacture of steel which consists in subjecting basic steel to the action of high temperature and metallic oxids in a furnace having an atmosphere of carbon dioxid and nitrogen.

6. The herein described process of removing phosphorus and sulfur from basic steel, which consists in subjecting the steel to a high temperature and simultaneously to the action of metallic oxids in the presence of a non-combining atmosphere.

In testimony whereof, I affix my signature, in the presence of two witnesses.

GEORGE HILLARD BENJAMIN.

Witnesses:
CHARLES WESLEY DUNN,
HELEN E. KOLLSCH.